United States Patent [19]
Chen et al.

[11] Patent Number: 5,940,839
[45] Date of Patent: Aug. 17, 1999

[54] FAULT-TOLERANT SYSTEM AND METHOD OF MANAGING TRANSACTION FAILURES IN HIERARCHIES

[75] Inventors: Qiming Chen, Sunnyvale; Umeshwar Dayal, Saratoga, both of Calif.

[73] Assignee: Hewlett-Packard Company, Palo Alto, Calif.

[21] Appl. No.: 08/835,089

[22] Filed: Apr. 4, 1997

[51] Int. Cl.⁶ .................................................. G06F 17/30
[52] U.S. Cl. ........................... 707/202; 707/200; 707/10; 395/180
[58] Field of Search .................................. 707/202, 201, 707/200, 10; 395/180; 371/48

[56] References Cited

U.S. PATENT DOCUMENTS

| | | | |
|---|---|---|---|
| 4,819,159 | 4/1989 | Shipley et al. | 395/182.17 |
| 5,241,675 | 8/1993 | Sheth et al. | 707/8 |
| 5,247,664 | 9/1993 | Thompson et al. | 707/10 |
| 5,335,343 | 8/1994 | Lampson et al. | 395/182.17 |
| 5,404,508 | 4/1995 | Konrad et al. | 707/202 |
| 5,465,328 | 11/1995 | Dievendorff et al. | 395/182.13 |
| 5,481,699 | 1/1996 | Saether | 395/182.13 |
| 5,504,899 | 4/1996 | Raz | 707/10 |
| 5,682,527 | 10/1997 | Cooper et al. | 707/202 |
| 5,729,733 | 3/1998 | Sharif-Askary | 707/8 |
| 5,758,356 | 5/1998 | Hara et al. | 707/202 |
| 5,764,897 | 6/1998 | Khalidi | 395/200.31 |

OTHER PUBLICATIONS

Gim Gray et al., "Transaction Processing: concepts and techniques", Morgan Kaufmann Publishers, pp. 203–205, Jan. 1997.

Ahmed K. Elmagarmid, Database Transaction Models for Advanced Applications, Morgan Kaufmann Publishers, pp. 124–158, Jan. 1997.

Sape Mullender, Distributed Systems 2nd edition chapter 13 Transaction–Processing Techniques, pp. 329–352, Jan. 1993.

*Primary Examiner*—Paul V. Kulik
*Assistant Examiner*—Greta L. Robinson

[57] ABSTRACT

A fault-tolerant technique for managing cross-hierarchy failure of a process of transactions is disclosed. The process has blocks of transactions and one or more of the transactions may be subtransaction of others. The technique includes enabling a block having one or more transactions in the process to notice, e.g., the failure in a transaction not in the process, wherein the noticed failure will cause a failure of a transaction (FFT) in the process. The technique also includes, upon the failure of the transaction FFT in the process, determining an in-progress closest recoverable ancestor (ICRA) in a block in the process. The ICRA is the nearest transaction to the failed transaction FFT, in the block on an ancestor tree of the FFT, that is in-block-recoverable and in-progress. The technique further includes recovering from the first process failed transaction by undoing from the ICRA to that failed transaction. The undoing step includes aborting or compensating one or more transactions, or both. In the case that the closest recoverable ancestor (CRA), i.e., the nearest transaction to the FFT is not in-progress, the closest in-progress ancestor (CIP) of the CRA and the closest recoverable in-progress ancestor (ERA) of the CIP are identified. The CIP is the nearest transaction to the CRA, on the ancestor tree of the FFT, that is neither committed nor aborted as viewed from outside the first process. The ERA is the nearest in-block recoverable transaction to the CIP on the ancestor tree of the FFT and in progress in a block containing the CIP.

26 Claims, 11 Drawing Sheets

TRANSACTION SPECIFICATION

TRANSACTION EXECUTION HISTORY

FAULT-TOLERANT SYSTEM AND METHOD OF MANAGING TRANSACTION FAILURES IN HIERARCHIES

FIELD OF THE INVENTION

The present invention is generally related to computerized database systems. More particularly, the present invention is related to systems and methods for recovering from failures in transactions in nested transactional structures.

BACKGROUND

Many business, engineering, and scientific operations involve multiple steps and are implemented on a number of processors such as computers, each of which uses data maintained in one or more databases. The processors are connected to enable communication. For example, in a business operation, a design (e.g., software designs for controlling finance or machines) might include preparing the specification and implementation according to the specification. Such a business operation can involve many computers and transactions. Requests are sent by one computer to others. The requests are acted upon, then the database in each computer involved is updated. One approach to handle such transactions is to link them each as atomic action, some of which links may be sequential, concurrent, or both. This is the "flat transaction" structure. See, e.g., Leymann et al., "Business process management with flowmark," *Proc. Compcon '94*, 1994; and McCarthy et al., "Workflow and transactions in concert," *Bulletin of the Technical Committee on Data Engineering*, IEEE Computer Society, 16(2),1993.

Occasionally, in transactions, a fault may occur. Examples of faults are communication line failure, equipment inoperability or unavailability, and the like. Investigations on techniques in managing computer systems to overcome faults and their effect in transactions have been reported. One approach involves nested transactions, in which parallel subtransactions can be executed (see., e.g., Dayal, et al. "A Transactional Model for Long-Running Activities," *Proceedings of the 17th International Conf Very Large Data Bases*, pp. 113–122, Barcelona, Sept., 1991). A process involving a database in a computing node can be modeled as layers of transactions. Such a layering structure introduced intermediate level of control, allowing failure recovery at certain levels.

In general, relating to fault-tolerant computer systems, a transaction is a performance of a number of actions on data in a database. Generally, a transaction can have a number of subtransactions. Furthermore, each subtransaction can itself have a number of subtransactions. Transactions, including those transactions that are themselves subtransactions, that have subtransactions are considered to be "parents." Subtransactions of parents are the "children" of the parents. Parents and children can be arranged in a hierarchy of blocks. A block can itself be a hierarchy containing a hyperactivity that has subactivities. That is, a transaction, T, may have subtransactions and be itself considered a block, denoted by $B^T$, of subtransactions. The transaction T is referred to as the hyper-transaction.

A transaction, which may be a subtransaction of another transaction, is committed when the effects of its execution are made permanent and become visible to other transactions, depending on its scope of commitment. If a transaction cannot be completed, as when there is a fault, it is aborted. A transaction is terminated when it has been committed or aborted. Otherwise, it is considered to be in progress. A transaction is performed with atomicity if in its performance all or none of the actions in the transaction are completed. In some cases, transactions have more relaxed atomicity in the sense that the transaction is committed only if all of its critical actions are completed or compensated. If a child transaction cannot commit or be compensated for, then the effect of the transaction is not completed and any tentatively committed subtransaction is undone, thereby aborting the whole transaction. A subtransaction is compensatable if the execution of another subtransaction at the first subtransaction's local site can compensate for the effects of its execution. A compensating transaction undoes any effect of a transaction for which it compensates, but does not necessarily restore the database in which the compensated-for transaction is executed to its original state prior to the execution.

Sometimes multiple concurrent, in-progress transaction hierarchies (i.e., involving different databases) may need to be coordinated to accomplish a process. In other words, a process may depend on a transaction of another process, i.e., there are dependencies crosstransaction hierarchies. For example, in the software design case above, if for some reason a transaction in preparing the specification fails, it may cause the failure of a transaction in the process of implementing the specification (once it has commenced). The failure in the implementation process would have to be recovered. In the transaction hierarchy representing a transaction process, a failure of a subtransaction may cause its parent to fail, and the failure may propagate to higher level ancestors as well. Mechanisms have been proposed for determining the failure scope and for logically rolling back the business process in that scope. See, e.g., Weikum et al., "Concepts and applications of multilevel transactions and open nested transaction," *Transaction Models for Advanced Database Applications*, A. Elmagamid (ed.), Morgan-Kaufmann, 1992.

Up to now, mechanisms have been reported only for application to a single transaction hierarchy and they do not readily support failure handling across transaction hierarchies. Handling failures across transaction hierarchies differs significantly from doing the same in a single transaction hierarchy. In a single transaction hierarchy, a parent transaction may not terminate until all its child transactions terminate. Thus, when a failure occurs, the parent and the direct ancestors of the originally failed transaction are still in progress, making it feasible to pass control up the hierarchy. In contrast, when a transaction failure is caused by the failure of another transaction from another transaction hierarchy, a transaction, which should abort as a result of the failure, may have been committed already. In this situation, committed transactions at certain levels should be invalidated by compensation. In a flat transaction scheme, the transaction can only commit to the public database. Failure handling is accomplished by undoing the transaction starting from the failed item in the sequence before the transaction is committed. The effect of the failure is not known to the outside. Only failures in the sequence of the transaction can be handled. For this reason, existing failure handling techniques are not adequate for recovering from cross-hierarchy failures. Thus the flat transaction scheme lacks the capacity to handle cross-steps or cross-hierarchy transaction failures or exceptions. What is needed is a technique for efficiently handling such cross-hierarchy transaction failures.

SUMMARY

The present provides a fault-tolerant technique that can efficiently handle crosshierarchy transaction failures. The invention can handle nested and flat structured transactions equally well. The present invention integrate nested and flat structured transactions into a transaction hierarchy, where a transaction may represent a block of subtransactions that are connected sequentially, concurrently or conditionally. A subtransaction can further represent an inner block of subtransactions. Thus, the transaction's execution history is represented in a tree form, having multilevel blocks. This is referred to as the "history tree." Failure recovery is achieved by taking advantage of the ability to trace any transaction in a process in its corresponding history tree, which represents the execution history of the transaction.

This invention provides a technique for managing a plurality of transaction in a process. A subtraction in the process may be a subtransaction of another transaction. Upon the failure of a transaction (FFT) in the process, the closest recoverable ancestor transaction that is in progress (ICRA) in the block containing the ICRA is determined. The (ICRA) transaction is the nearest in progress, in-block recoverable transaction to the FFT, in the block starting from and including the failed transaction itself in the ancestor tree of the failed transaction. In most cases, that means the ICRA either is non-critical to the block or has in the block an alternative transaction path not including the failed transaction. As used herein, the "ancestor tree" of a transaction is a tree representing the history of the transaction and includes the transaction and its ancestors, if any, i.e., parent, grandparent, and the like. To recover from the failure, the failed transaction is undone by proceeding from the ICRA downward, including the FFT. As used herein, "undoing" a transaction can mean either aborting, compensating for the transaction, or both. "Downward" means going in the direction of the descendants, i.e., children, grandchildren, and the like.

Sometimes, a failure of a transaction in a process may be caused by the success or failure of a transaction in another process. In an embodiment, the present technique allows a transaction in a process to notice success or failure of another transaction that is not part of the process wherein that success or failure of that another transaction causes the failure of the transaction in the process.

In an embodiment in which the closest recoverable ancestor (represented by "CRA" herein regardless of in-progress or not) of the FFT is no longer in-progress, the technique further includes identifying a closest in-progress ancestor (CIP) of the CRA. The CIP is the nearest transaction, on the ancestor tree of the FFT, that is neither committed nor aborted as viewed from outside the process. In an embodiment in which the CIP is not in-block recoverable (in most cases that means it is critical to the process and has no alternative transaction path that does not include the CIP ancestor), the technique further includes identifying a closest recoverable in-progress ancestor of the CIP, i.e., the closest recoverable ancestor of the CIP in the block of transactions containing the CIP. This transaction is called the extended recoverable ancestor (ERA) herein. The ERA is the nearest transaction, starting from and including the CIP itself, on the ancestor tree of the FFT, that is in-progress and in-block recoverable in a block including the ERA. The undoing can be performed on transactions from the ERA downward.

By using the above technique for determining the ICRA, or the CRA and CIP as well as the ERA, a hierarchical transaction structure, in the form of a history tree, of the execution of the process can be advantageously used to determine failure scopes and support backward and forward failure recovery over multiple transaction hierarchies, i.e., across hierarchies. Since this technique is equally useful in handling flat and nested transaction structures, it provides a unified mechanism applicable in both flat and nested, as well as for both failures originated in the same-hierarchy and cross-hierarchy. The present technique is superior to the flat transaction scheme because, as previously stated, the flat transaction cannot recover from cross-hierarchy failures. The present technique is superior to prior art nested transactions that commit to the database because using the present technique, by tracing back to the closest recoverable transaction that is in progress, we can recover from failures via a short transaction path and make use of time, as well as valuable resources, efficiently. It is to be understood that although the description of the present invention is in terms of business transactions, the transaction can be a process for controlling or manipulating physical devices, e.g., in controlling robotics, or operating an assembly line that includes parts delivery. For example, a process can include the transaction "removing part A from socket A" and another process can include the transaction "checking part A to see if it will fit into socket B."

BRIEF DESCRIPTION OF THE DRAWINGS

The following figures are included to better illustrate the embodiments of the apparatus and technique of the present invention. In these figures, like numerals represent like features in the several views.

DETAILED DESCRIPTION OF THE INVENTION

In the present invention, to undo a failure of a transaction (FFT) in a hierarchical process, the closest in-block recoverable in-progress ancestor (ICRA) is found for the failed transaction. The undoing steps proceed from the ICRA downward including the failed transaction. If the failure is caused by a cross-hierarchical failure originated in another process, the closest in-block recoverable transaction (CRA) to the failed transaction may not be in progress. In this case, the CRA's closest in-progress ancestor (CIP) and the closest recoverable ancestor of the CIP, i.e., the "extended recoverable ancestor" (ERA), are found and the undoing steps proceed from the ERA. ICRA, CRA, CIP, and ERA will be described in further detail in the section "Failure Scope and Recovery" below.

Figure 1:
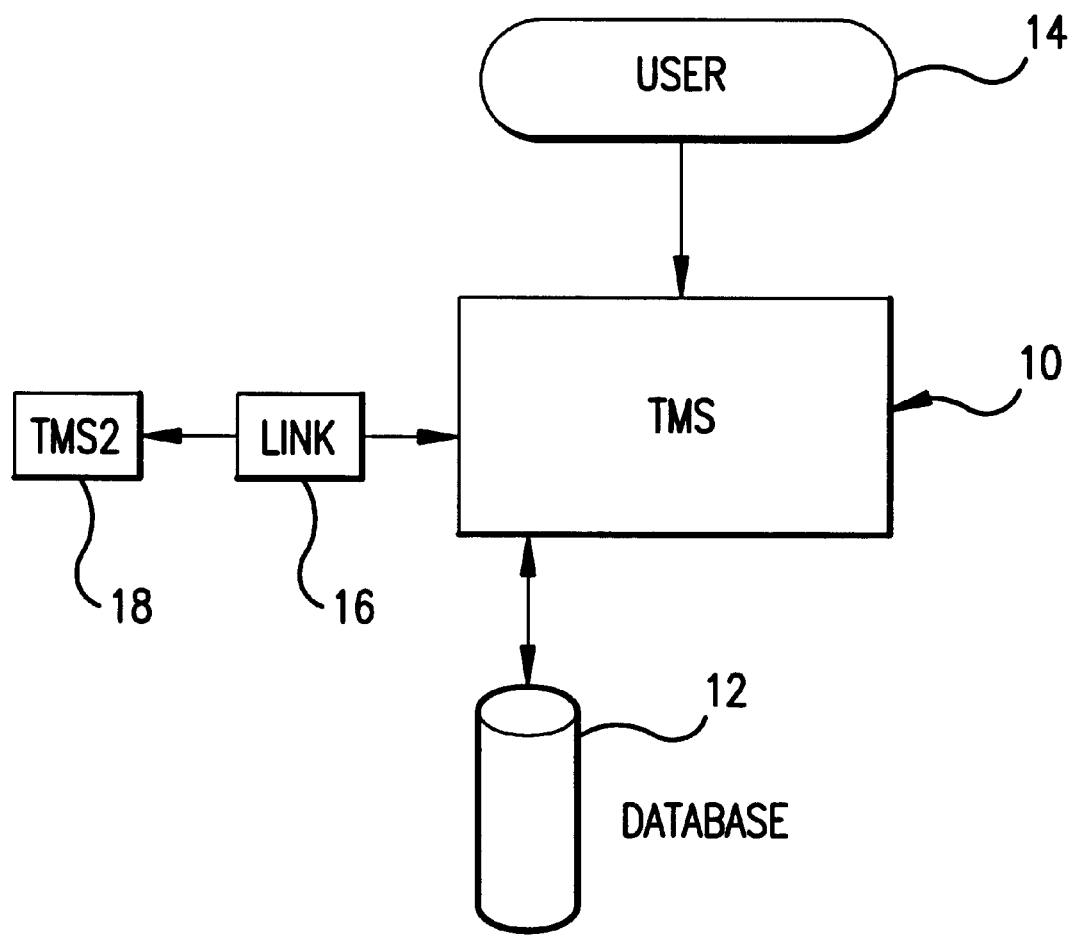
FIG. 1 shows an embodiment of the transaction management system of the present invention.

FIG. 1 illustrates a fault-tolerant transaction management system of the present invention. The fault-tolerant transaction management system (TMS) 10 interacts with a database 12. A user 14, typically via an interactive device such as a computer terminal, accesses the TMS to implement transactions. As the transactions are implemented, data are extracted from or inputted into the database 12. The TMS is a computing device, which can be or include e.g., an electronic computer, a microprocessor, a neuro-network processor, and the like. A link 16 provides a mechanism for communication such that failure of a transaction in a second transaction management system (TMS2) 18 would lead to a failure in a transaction in the TMS 10. The link can include conventional communication hardware such as cables, fiber optics, telephone lines, switches, logic circuities, memory, and the like.

To undo the failure effect of a transaction, say transaction T, that fails in the TMS 10, the TMS 10 has a mechanism for determining the ICRA of the failed transaction T. As used herein, unless specified to be otherwise, "failed transaction" refers to the lowest failed transaction in the first process in TMS 10, e.g., the transaction in TMS 10 that originally fails or whose failure is caused cross-hierarchically by a transaction in the second process TMS2. In the case that the failure of transaction T is caused by a failure of a transaction in TMS2, the TMS 10 has a mechanism for finding the CIP of the CRA and a mechanism for finding the ERA. To facilitate finding these transactions, the TMS 10 can have a mechanism for constructing a history tree such that all transactions are layered, such that no two transactions are strictly sequential or concurrent. The TMS 10 can be a single computer, or it can include computers, microprocessors, and the like, each performing different functions to achieve the desired goal. For example, the above mechanisms can be in a single computer, or be implemented by different computers or microprocessors, and the like. Similarly, the further detailed operations described below can be done by a different computing devices such as computers, microprocessors, and the like.

Figure 2:
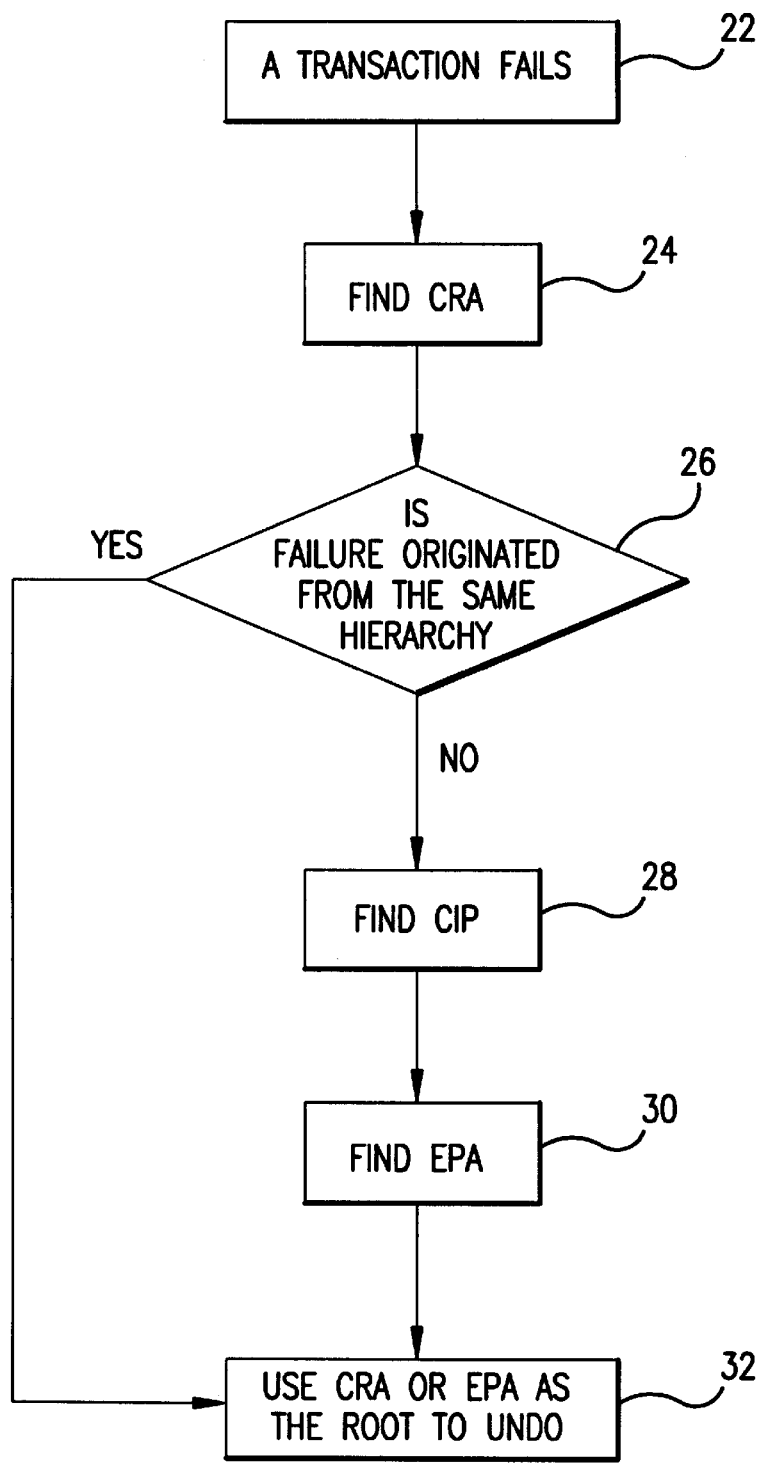
FIG. 2 shows a flow diagram for managing transactions according to the present invention.

FIG. 2 shows a preferred method of recovery from transaction failure according to the present invention. To recover when a transaction fails (block 22), the CRA is found (block 24) by tracing upwards (i.e., going to the ancestors) of the failed transaction to find the nearest transaction that is in-block recoverable. After the CRA is found, depending on the transactional condition, two possibilities exist (block 26). If the failure is originated from the hierarchy of the same process, the CRA can be used as the root for undoing. If the failure is originated from a failure outside the hierarchy of the process, the CIP (block 28) and then the ERA (block 30) are determined by further tracing upward. In this case, the ERA is used as the root for undoing the effects of the failure (block 32).

The conditional block 26 can be placed after the "find CIP" block 28 or after the "find ERA" block 30 and the effect will be the same. In fact, as an alternative, the conditional block 26 can optionally be eliminated such that the CIP and ERA are always determined. If the failure is not cross-hierarchical but originated from the same process hierarchy, the CRA, CIP, and the ERA will in fact be the same transaction.

To facilitate the understanding of the system and the recovery of failure, the technique of the present invention is described in further details below.

Constructing Process History in Hierarchical Form

To permit failure recovery, in the present invention, the execution history of the transaction is arranged in a hierarchical form.

A. Process Specification

How a process of transaction should progress is specified in a multilevel nesting structure to achieve the goal of the process. The transactional process, such as a business process, is organized in nested blocks, i.e., having subblocks within a block structure. In other words, all the transactions in a sub-block are completed before the parent of the subblock can be completed. For flexibility, flat structured transactions are also allowable at each level in the specification. A transaction can represent a block, denoted by $B^T$, of subtransactions, and T is referred to as a hypertransaction. Since a subtransaction can represent another inner block, multilevel block nesting (and hence a transaction hierarchy) can be formed through nesting of hypertransactions blocks. A process is a top-level block that contains multilevel nested blocks representing either subprocesses or nested process modules. Transactions contained in a block are linked according to required control flow and data flow, where conditional branching, parallel splitting and joining, as well as looping are allowed. As used herein, the "block of a transaction $T_i$" is the innermost block containing $T_i$, where the transaction representing that block is referred to as block-root ($T_i$) and i is an integer identifying the particular transaction of interest.

To enable recovery from a transaction failure, a transaction at any level may be paired with a contingency (or alternative) transaction. A certain transaction may also be paired with a compensation transaction that can logically eliminate the effect of the transaction T. A compensation or contingency transaction can be flat or hierarchical and may be structured differently from the original transaction. A contingency transaction may in turn have its own contingency transaction.

B. Process Execution

When the process is executed, the factual execution history of the process can be represented by an execution history tree. Depending on the process, the model of the process specification may not be the same as the execution history tree and it is important to distinguish the two. The former describes the structure and control flow of the process thus directs the logical flow of the execution. The latter is dynamically constructed based on the runtime situation, expressing the actual progress of the process instance and recording the history of its execution, and thus can be used to handle not only the downward progress of the process but also the failure recovery of the process instance. To execute a business process, an instance of its top-level transaction is created based on its specification. However, the instance of a component transaction is created only when it is to be executed.

Figure 3A:
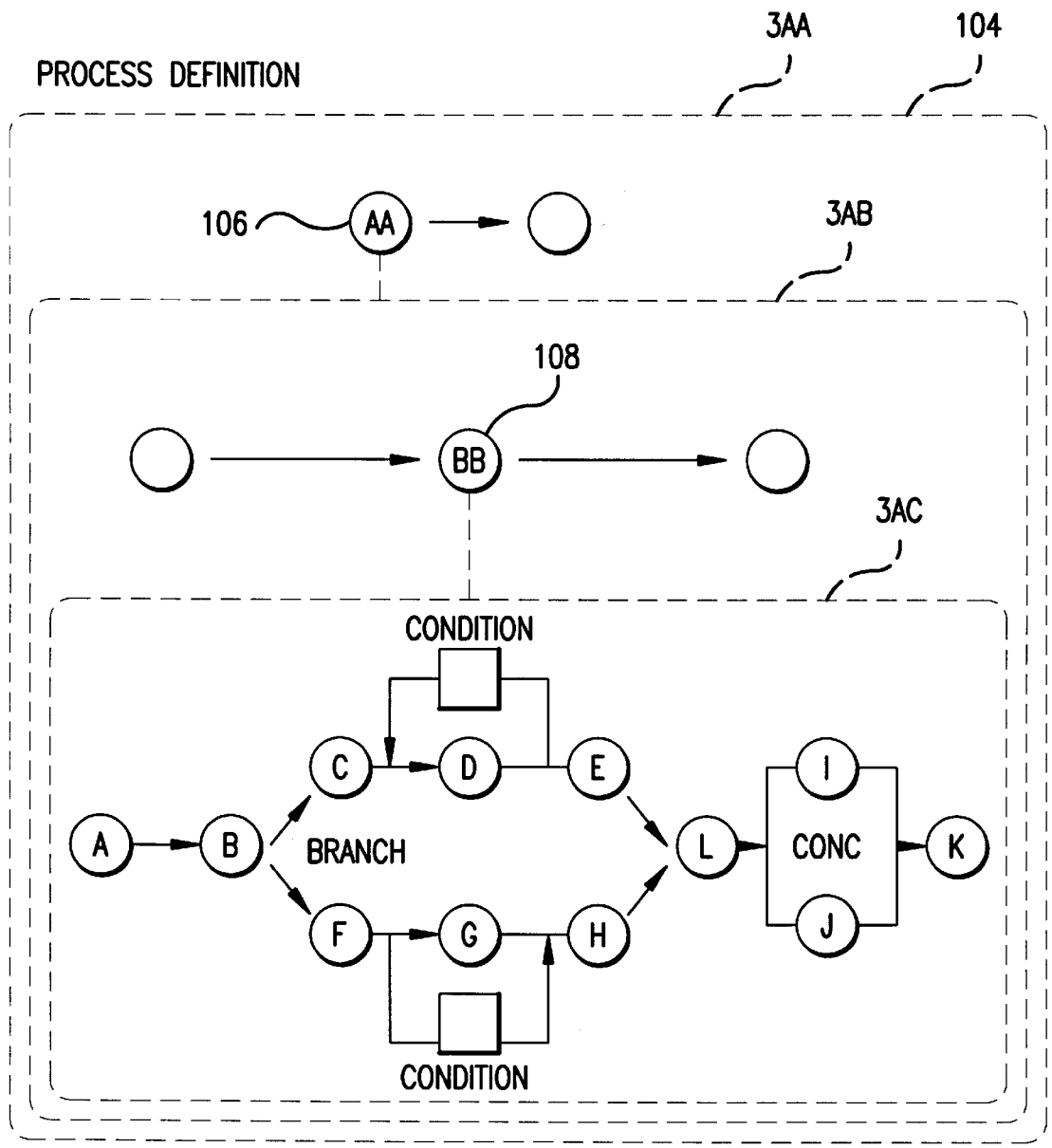
FIG. 3A shows the specification of a transaction.
Figure 3B:
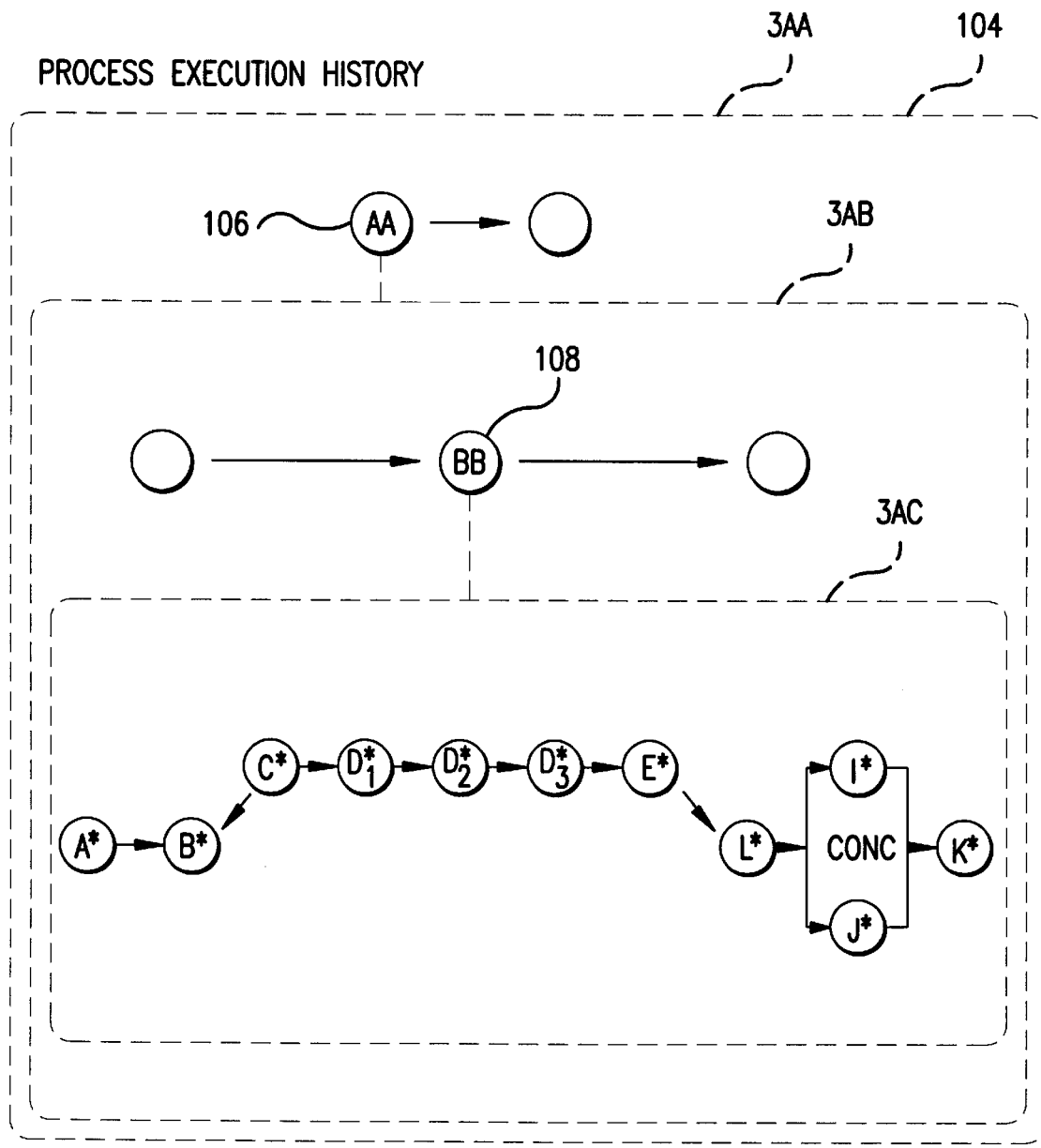
FIG. 3B shows the actual transaction history of the transaction of FIG. 3A.

FIG. 3A shows the specification model of a process 104. In process 104 (which is represented by block 3AA), a transaction 106, which can be represented by a block 3AB, has a subtransaction 108, represented by sub-block 3AC. Some of the subtransaction in sub-block 3AC are within conditional branches and loops. When such transactions are executed, the transactions in block 3AC can be described linearly according to their actual executions, as shown in FIG. 3B. In FIG. 3, transactions D and G are conditional. Transactions I and J are concurrent.

Thus, the relationship between transaction instances in the same block can be described by the combination of the follows.

$<T_1, \ldots, T_n>$ where $T_1, \ldots, T_n$ are a list of transaction instances executed sequentially.

$\{T_1, \ldots, T_n\}$ where $T_1, \ldots, T_n$ are a set of transaction instances executed concurrently, possibly with multiple threads of control.

A multilevel business process instance is built recursively with sequential and parallel transaction instances. For brevity, herein a transaction instance is simply called a "transaction." When in execution, a transaction at any level undergoes state transitions—it is activated in the start state from which it exists until reaching the end of its work or a failure. Accordingly, a transaction terminates either in the commit state or in the abort state. When a transaction fails and the process needs to be undone, the transactional hierarchy has to be rolled back for abortion or compensation. Rolling back a block, i.e., a transaction hierarchy, fully or partially, is not based on its specification, but on its execution history.

C. Layered Block Execution History Tree

In failure recovery, rolling back transactions in a block may undo several transactions, which means having to undo several transaction blocks if those transactions represent inner blocks. To construct a history tree, the history of the block execution is recorded in a layering form, starting from a starting point and expressing the actual execution history by incorporating transaction nodes and dummy nodes. As mentioned above, the history of a set of transactions executed sequentially or concurrently, is represented by $<T_1, \ldots, T_n>$ or $\{T_1, \ldots, T_n\}$ We introduce a layering operator $\Delta$, such that $<T_1, \ldots, T_n> = \Delta;<T_1, \ldots, T_{n-2}, \Delta:<T_{n-1}, T_n>>$, and such that iteratively $\Delta:<T_1, \ldots, T_n> = \Delta:<T_1, \Delta:<T_2, \ldots, \Delta:<T_{n-1}, T_n>>$, where $\Delta:<T_i, T_j>$ represents a dummy node, $T'_i$, that is the parent of a sequence of nodes $T_i, T_j$.

Figure 4A:
FIG. 4A shows an example of sequential transactions.
Figure 4B:
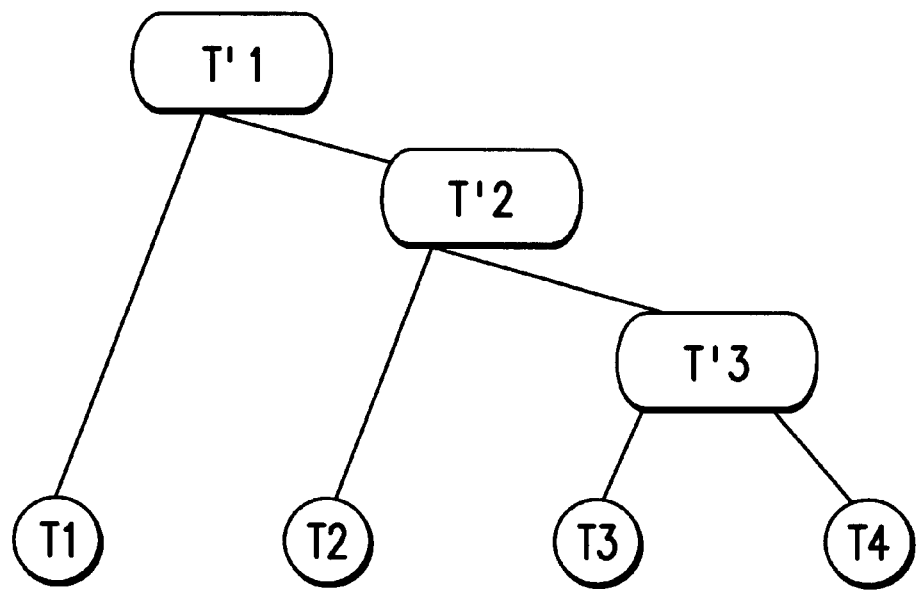
FIG. 4B shows the sequential transactions of FIG. 4A after transforming into a hierarchical form according to the present invention.

With the introduction of n−1 dummy nodes, $<T_1, \ldots, T_n>$ is converted into a tree structure, as illustrated in FIG. 4. FIG. 4A shows an illustrative sequential transactional process, including transactions $T_1, T_2, T_3,$ and $T_4$. In FIG. 4B, by introducing dummy notes $T'_1, T'_2,$ and $T'_3$, the sequential transactions are rearranged into a purely hierarchical form. A block in a purely hierarchical form has no sequential transaction, i.e., no transaction in the block has one parent and only one child subtransaction. In FIG, 4B, if the transaction is a terminal transaction, such as $T_1, T_2, T_3,$ and $T_4$, it has no descendant. Preferably, if a transaction is a nonterminal transaction, such as $T'_1, T'_2,$ and $T'_3$, it has more than one child subtransaction. For example, dummy transaction $T'_1$ has subtransactions $T_1$ and $T'_2$, which has subtransactions $T_2$ and $T'_3$, and so forth.

Figure 5A:
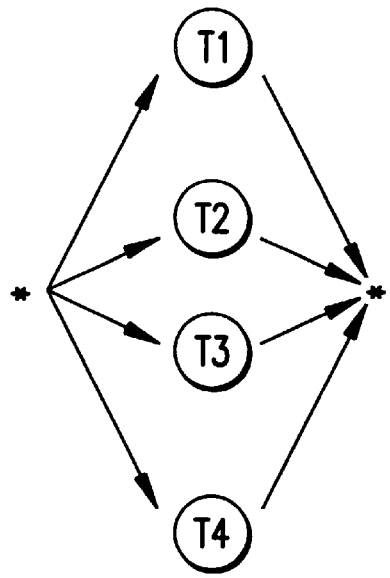
FIG. 5A shows an example of concurrent transactions.
Figure 5B:
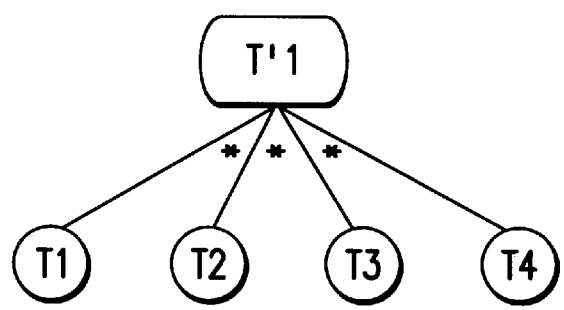
FIG. 5B shows the concurrent transactions of FIG. 5A after transforming into a hierarchical form according to the present invention.

Similarly, the concurrent transactions $T_1, \ldots, T_n$, (e.g., a case where n=4 is shown in FIG. 5A), via the introduction of a dummy node $T'_1$ representing the layering operation $\Delta:\{T_1, \ldots, T_n\}$, the history tree can be constructed having $T_1, \ldots, T_n$ as the concurrent child nodes (as illustrated in FIG. 5 for n=4) of $T'_1$. $T'_1$ has more than one child transaction. fAfter the addition of the dummy node $T'_1$, the originally concurrent transactions $T_1, \ldots, T_n$ now become terminal transactions, in that they have no children.

Figure 6:
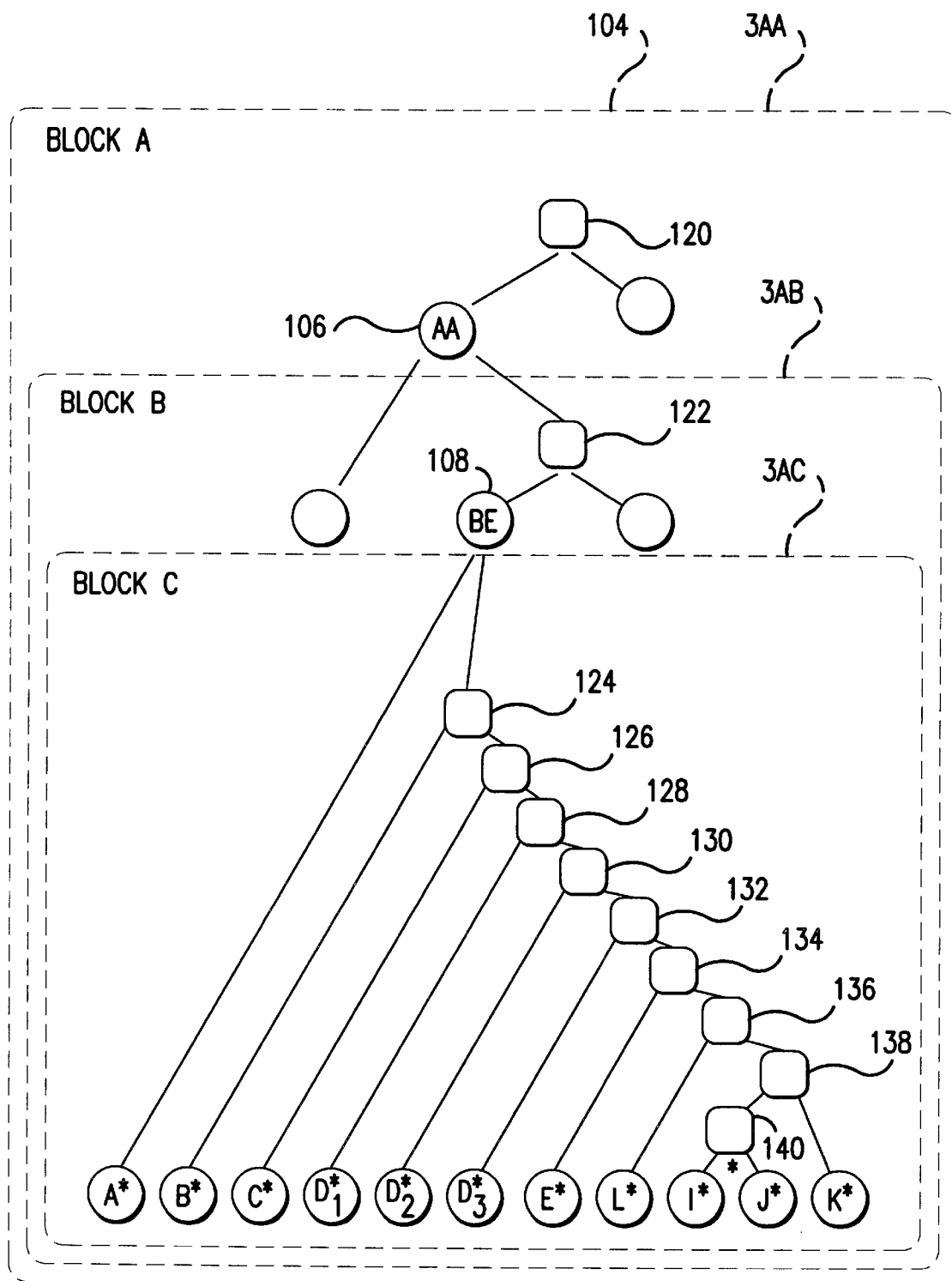
FIG. 6 shows the transactions of FIG. 3B after transforming into a hierarchical form according to the present invention.

While the execution history of a transaction hierarchy with multilevel blocks forms a history tree, e.g., as in FIG. 3B, the execution history of a block forms a block history tree. In the present invention, to facilitate the undoing of transaction upon failure of a transaction, a block history tree, if not already in a purely hierarchical form, is made into one by the incorporation of dummy notes. Thus, depending on the process, the root of a block history tree can be the hyper-transaction representing that block, or it can be a dummy one. On the other hand, the block-root of a transaction may not be the parent transaction of transaction, but may be a dummy note. This is illustrated by FIG. 6, which is the pure hierarchical form corresponding to the execution history tree shown in FIG. 3B. FIG. 6 illustrates the layering of a multilevel block, e.g., block 3AC, with both sequential and concurrent transactions in a single block. Transactions 120, 122, 124, 126, 128, 130, 132, 134, 136, 138, and 140 are dummy notes. In this structure, all sequential and concurrent transactions are linked to other transactions hierarchically by adding dummy notes to the transaction structure. Preferably, all transactions in the process are linked together hierarchically so that the history tree is purely hierarchical by adding dummy notes.

D. Commit Control

The multilevel block structure of our transaction model allows us to adequately balance atomicity and concurrency and to control visibility and protection in a transaction hierarchy. A block has a logical data container called the Block Data Container (BDC). The BDC of the top-level block of a transaction hierarchy is actually the process data container. Data held in the BDC of a block is visible to the contained transactions in the block and in any inner blocks. In other words, a transaction can acquire data from the BDC of a block containing it directly or iteratively. A transaction can also acquire data by accessing external data sources.

In general, upon termination, a transaction can commit to various levels. If "committed to the block-root," the results of the terminated transaction is checked-in at the BDC of the containing block, making its effect visible to the transactions inside that block. An alternative is to "commit to top," which means checking-in its results to the BDC of the top-level block, making its effect visible to all transactions of the process. The third alternative is to "commit to database," which means checking-in its results to an external database, making its effect permanent and visible to public. Other schemes of commit control, such as committing to an arbitrary level ancestor, are also possible. The technique of the present invention for managing failure recovery is applicable for these schemes. This permits flexibility in balancing atomicity and concurrency of transactions.

E. Failure Handling

To recover from a transaction failure, two important issues are: (a) determining the failure affected scope, and (b) undoing the transactions in that scope. In general, transactions with results internal to that scope should be aborted, and those with results externalized beyond that scope should be compensated for. Unlike in prior art techniques in which only uncommitted transactions can be aborted, in the present invention, if a BDC is implemented in terms of database, transactions in that block may be aborted by executing transactions for deleting, updating or restoring the BDC. Conventionally, compensation is used to eliminate the effect of a transaction committed to database and visible to public. However, in the presence of multilevel commit scopes, transactions with effect visible beyond the failure scope must be compensated for, even if that effect is not publicly visible, thus the need for process "internal" compensation. In this invention, the compensation of a transaction hierarchy may be made directly or indirectly through compensating its subtransactions, e.g., in a make-application transaction, the transaction can be compensated for directly by withdraw-application, or indirectly by canceling each step of it. In this way, if a transaction is not recoverable inside a block, its effects can still be logically eliminated at higher-levels.

The failure-handling mechanism of the present invention is advantageous over prior art models that require every step failure to cause the whole process to fail because such models are inefficient since rolling back a process may erase a lot of work. In the present invention, the combination of backward failure recovery and forward failure recovery allows a process to partially rollback to an acceptable restart point, then continue to "roll forward" to make further progress.

F. In-Block Recoverable Transaction

Handling failure inside a block or in a flat process can be done by mechanisms such as rolling back previously completed transactions in the inverse order of their execution and re-routing the business process through alternative paths. In general, a transaction T is said to be "in-block recoverable" upon failure if there exists a recovery-plan within its block, B, in the following cases:

(a) T is non-critical to block B and thus its abortion can be ignored, and the block execution can continue;

(b) T can be replaced by a contingency transaction acting as its exception handler, and thus, upon T's abortion the block execution can continue by rerouting through the contingency transaction;

(c) T is retriable, that is, T will eventually succeed if retried a sufficient number of times;

(d) Upon the failure of T, the block execution can roll back to such a transaction from which an alternative path is available; or (e) A modifiable transaction is specified by the business process designer, $T_m$, preceding the failed transaction, T, such that the block execution can roll back (without causing block B to fail) to $T_m$, then restart by redoing $T_m$. (Logically this is equivalent to that the path from $T_m$ to T is retriable.)

The block of a transaction is the block that immediately contains the transaction and its descendants.

Thus, when a transaction T is in-block recoverable, upon failure of T, the block execution can roll back to a transaction called the rollback-point of T and then restart from above that transaction, possibly through an alternative path. In the block history tree, rolling back to the rollback-point of T is equivalent to undoing the subtree downward of the dummy node or transaction node that is the parent of rollback-point of T.

Failure Scope and Recovery

In the presence of multilevel commit scopes, different pieces of partial results of a block may be visible to different scopes, and should be compensated in their matched scopes to ensure consistent commit and failure paths. For example, when a seminar announcement is made accessible to a department, the seminar cancellation notification should be made accessible to the same department, rather than to a smaller or a larger scope. When transaction T is in-block recoverable, undoing any transaction $T_k$ on the rollback path from T may not cause block B to fail. If this restriction is unsatisfied, the failure is not recoverable inside the block, but causes block-root of T to fail.

In the present invention, if a failed transaction is not in-block recoverable, the rollback is passed to the higher-level blocks until such an ancestor transaction of T is reached that is recoverable in its own block in the history tree. This is the "closest recoverable ancestor" (CRA) of the failed transaction, T. To illustrate, one can consider the case in which CRA, the in-block recoverable transaction closest to the failed transaction T, is in-progress. In this case, this in-progress CRA is the same as ICRA (see above). An example of this case is one in which the failure is not caused by a cross-hierarchical effect. The CRA of T is the closest in-block recoverable transaction on the ancestor tree of the transaction T. The CRA (which is the same as ICRA in the present illustrative because it is in progress) of T may be T itself, a hyper-transaction representing a block, or a dummy node that is the parent of a rollback point in a block. The failure recovery can be implemented by logically undoing the transactions in the history subtree that is rooted by the CRA of T. Searching the CRA of the originally failed transaction, is a two-step operation along the history tree:

(a) Identify the closest ancestor of T, say $T_c$, that is in-block-recoverable. If $T_c$ is self-recoverable, it is the CRA.

(b) Otherwise, identify the rollback-point of $T_c$. Then the node (which may be a dummy note) in the history tree that is the parent of rollback-point $T_c$, is the CRA of T. Therefore, the CRA of T may be a dummy node or a transaction node. A dummy node CRA in the history tree is above $T_c$. In that case $T_c$ is called the closest descendant transaction of the CRA of T.

The CRA of a transaction can also be a transaction without a parent (e.g. the top-level transaction of a process, a contingency transaction, or a compensation transaction). Potentially, every transaction in a transaction execution history tree has a corresponding CRA. The algorithm for resolving for the in-block recoverable transaction closest to the failed transaction (i.e., the CRA) can be simply expressed by the following "CRA(T)" algorithm. It is noted that this CRA(T) function does not in itself necessarily provide an in-progress transaction, but only an in-block recoverable one. If the CRA is in progress, the algorithm results in the in progress in-block recoverable transaction that is closest to the failed transaction, i.e., ICRA.

if is-top(T) then CRA(T)=T;
else if in-block-recoverable then CRA(T)=parent (rollback-point(T));
else CRA(T)=CRA (block-root(T)).

Figure 7A:
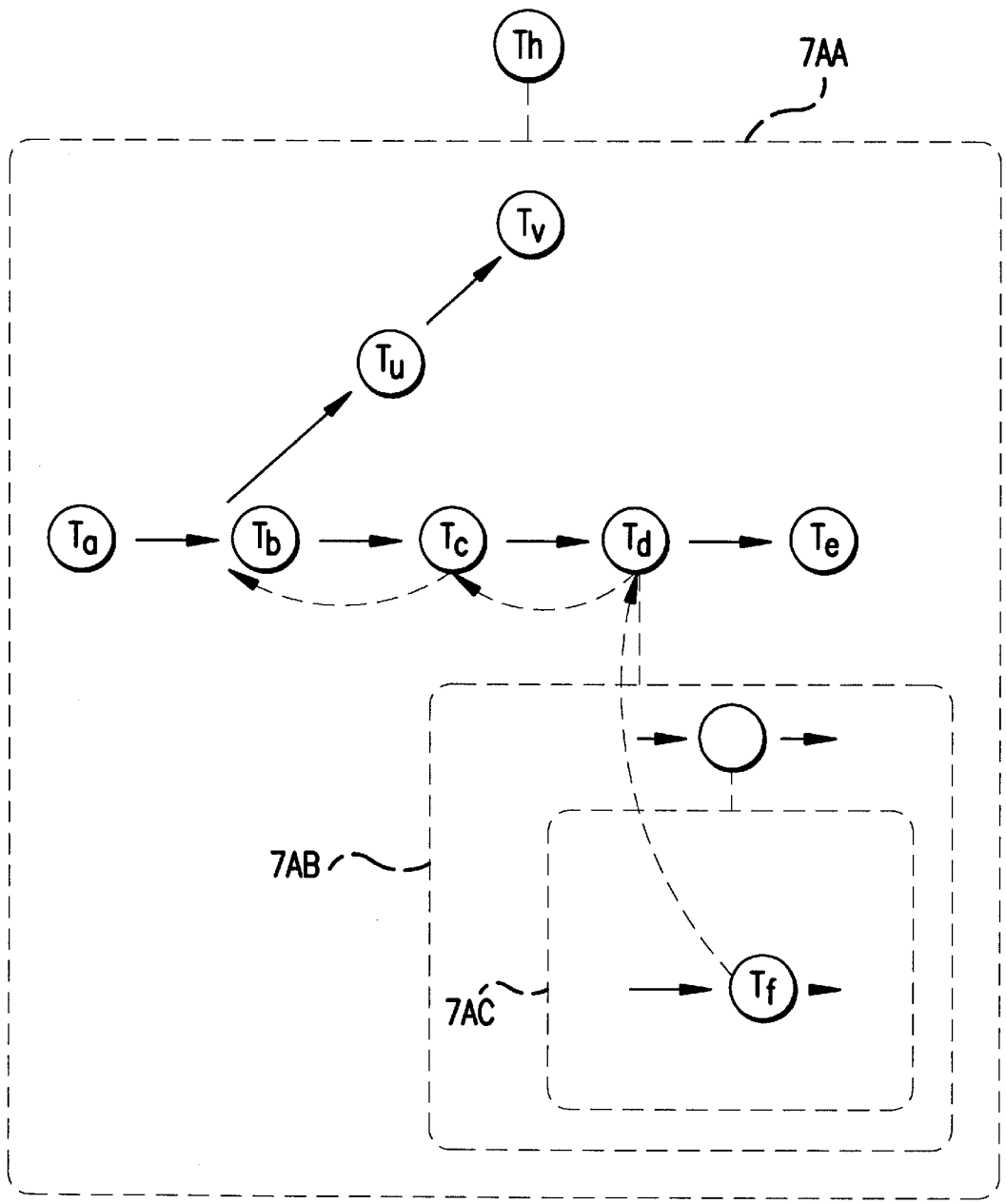
FIG. 7A shows an example of a specification of failure recovery
Figure 7B:
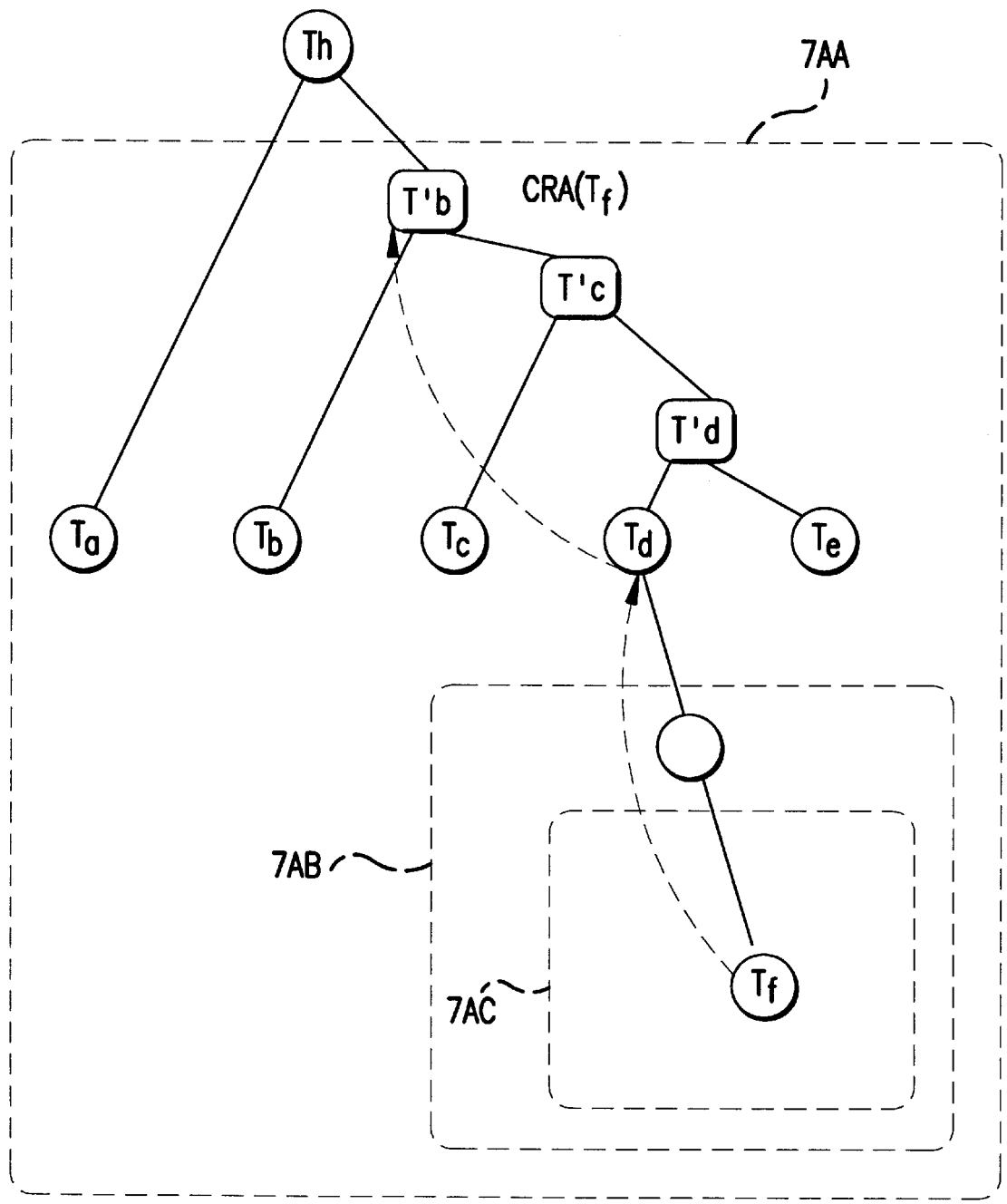
FIG. 7B shows an embodiment of the execution history of recovery from failure of the transactions of FIG. 7A according to the present invention.

As an example, in FIG. 7, a process Th of transactions, which has a block 7AA, can be executed through a first path in the order of <$T_a$, $T_b$, $T_c$, $T_d$, $T_e$> or through the alternative path <$T_a$, $T_u$, $T_v$>. Subtransaction $T_d$ itself includes sub-blocks 7AB and 7AC. FIG. 7A shows the process specification and FIG. 7B shows the execution history tree including the CRA. When the subtransaction $T_f$ fails, it lead to the failure of transaction $T_d$. $T_b$ is the rollback point because the transactions upward of $T_d$ have to be undone up to $T_b$. When transaction $T_d$ fails, the operation rolls back to $T_b$ by undoing $T_d$, $T_c$, and $T_b$ (and the subtransactions under them, if any), then rolls forward via the alternative path <$T_u$, $T_v$>. In this example, the rollback-point of $T_d$ is $T_b$. Based on the block execution history tree, the undoing procedure can start from a single entry, the dummy node $T_b'$, that is the parent of $T_b$, and then can be carried out hierarchically by undoing the subtree rooted by $T_b'$. The transaction $T_d$ is the closest ancestor that is in-block recoverable of the failed transaction $T_f$, with a rollback path from $T_d$ to $T_b$. Since $T_b'$ is the parent of $T_b$, the failure can be recovered by undoing the subtree with $T_b'$ as its root. $T_b'$, denoted as CRA(Tf) in FIG. 7, is the CRA of $T_f$. As used herein, undoing includes undoing (i.e., aborting, compensating, or both) all the transactions that are downward of the root, e.g., $T_{b'}$ in FIG. 7, provided that they need to be undone. If some of the transactions have not commenced yet, there will be no need to undo anything in them.

```
if T has sequential child nodes <T₁, T₂>
  then undosub(T)=<undo(T₂), undo(T₁)>;
  else if T has concurrent child nodes {T₁, ..., Tₙ}
  then undosub(T)={undo(T₁),..., {undo(Tₙ)}.
```

The algorithm of "undo(T)" can be expressed by the following, where nested(T) implies that T has subtransactions; T→db and T→top represent committing to database and top-level transaction respectively. The contingency transaction and compensation transaction of T are denoted by $T_{cg}$ and $T_{cm}$ respectively.

```
if is-transaction (T) then
   switch (state (T)){
      case in-progress:
         if nested(T) then undosub(T);
         else abort(T);
      case aborted:
         if executed (T_cg) then undo (T_cg);
      case committed:
         if T has committed to db and T_cm is defined then execute (T_cm→db);
         else if T has committed to top and T_cm is defined then execute (T_cm→top);
         else if nested(T) then undosub(T);
         else if T committed to block-root then abort(T).
   }
if is-dummy(T) then undosub(T).
```

A. Failure Recovery with CRA

Undoing a transaction hierarchy is a top-down operation. After a failure occurs and the ICRA of the transaction originally failed in the process is determined in the history tree, failure recovery eliminates the effect of the transactions in the history subtree beneath that ICRA. The general principle of undoing is that transactions with their effect internal to the undo scope should be aborted and transactions with effects externalized to the undo scope should be compensated for. For a transaction node T, if it has committed, but needs to be compensated for and is associated with a compensation transaction $T_{cm}$, then T and the whole transaction hierarchy beneath T can be directly compensated for by executing $T_{cm}$. Otherwise if T is still in-progress, the children of T are processed. The downward iteration may spread down along the transaction hierarchy such that each branch ends in a direct compensation or abortion.

A dummy node is not subject to committing, aborting, or compensation directly. Therefore, for a dummy node at any level, the undo operation is always pushed down to its child level, with sequential child nodes processed in the inverse order.

Transactions may have different commit scopes and they should be compensated for in matched scopes. This requires that the transaction $T_{cm}$ for compensating T to take the same commit scope as T. For a hyper-transaction with all the subtransactions, in the block it represents, committing to the database, the database is considered as its commit scope. For a hyper-transaction with all the subtransactions, in the block it represents, committing to the top-level transaction, the top-level transaction is considered as its commit scope. In this way, the hyper transactions can be compensated either directly or at its subtransaction level.

The definition of the undo operation can be define by the follow "undosub (T)" algorithm:

B. Failure Handling Across Block Hierarchy using CRA

In transaction dependencies across blocks or even across individual transaction hierarchies, a transaction $T_y$ may depend on the transaction $T_x$ in another process such that $T_y$ will only succeed when $T_x$ succeeds. Conversely, it is contemplated that $T_y$ can be arranged such that it fails if a transaction $T_z$ in another process succeeds. In any case, $T_y$ fails due to some effect of a transaction in a different process. Thus, a failure is caused across transaction hierarchies. Handling a cross-hierarchy failure is different from handling failure that is originated in the same transaction hierarchy. There are differences in both the failure scope determination and the failure recovery steps. In the former case, the block-root and direct ancestors of the originally failed transaction, up to its closest ancestor that is in-block-recoverable, are still in-progress. However, in the latter case, the transaction, $T_y$, to which the failure is transferred in, plus its ancestors, may be committed. For example, CRA of $T_y$, i.e., the in-block recoverable transaction that is closest to $T_y$, found by the function CRA($T_y$), may have committed. Even if the CRA($T_y$) is recoverable in its block, other transactions after it may not be in-block recoverable, which will lead to the failure being not recoverable in that transaction's block.

To make cross-hierarchy transaction failure handling deterministic, one can locate such an ancestor of $T_y$ that is in-block-recoverable and also in-progress, then start undoing top-down from its block, i.e., the block that is just big enough to include this ancestor of $T_y$. This is the closest in-progress ancestor (CIP). "In-progress" means the transaction has been started but has neither been committed nor aborted. If $T_y$ has not started, failure handling on $T_y$ is not necessary at this time. Else, if $T_y$ is in-progress, it can be treated as the original failure point in the transaction hierarchy. Else, if Ty has committed, it should be compensated at the same or a higher level.

Figure 8:
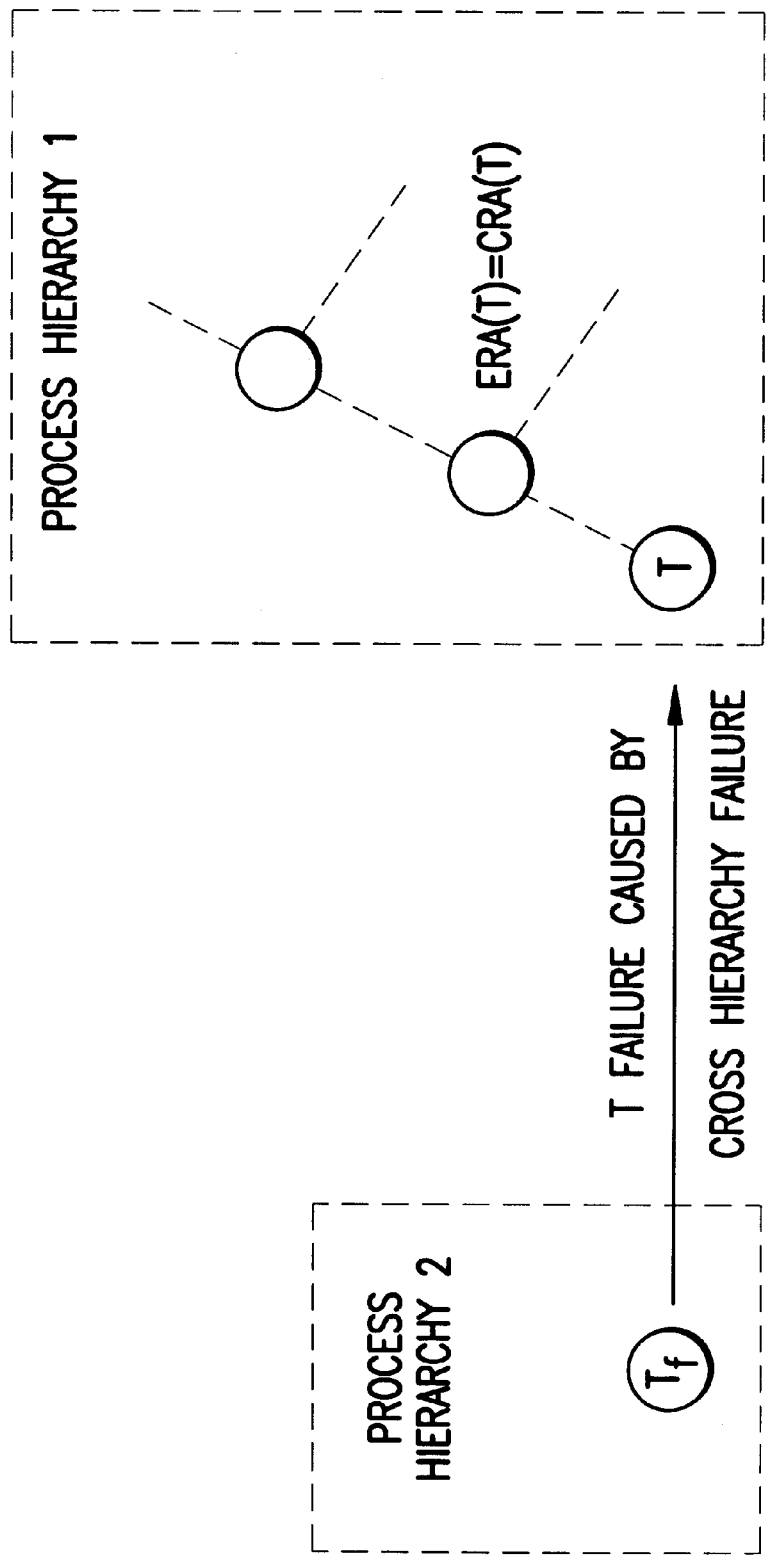
FIG. 8 shows an embodiment of recovery from transaction failure according to the present invention wherein the CRA is in progress.
Figure 9:
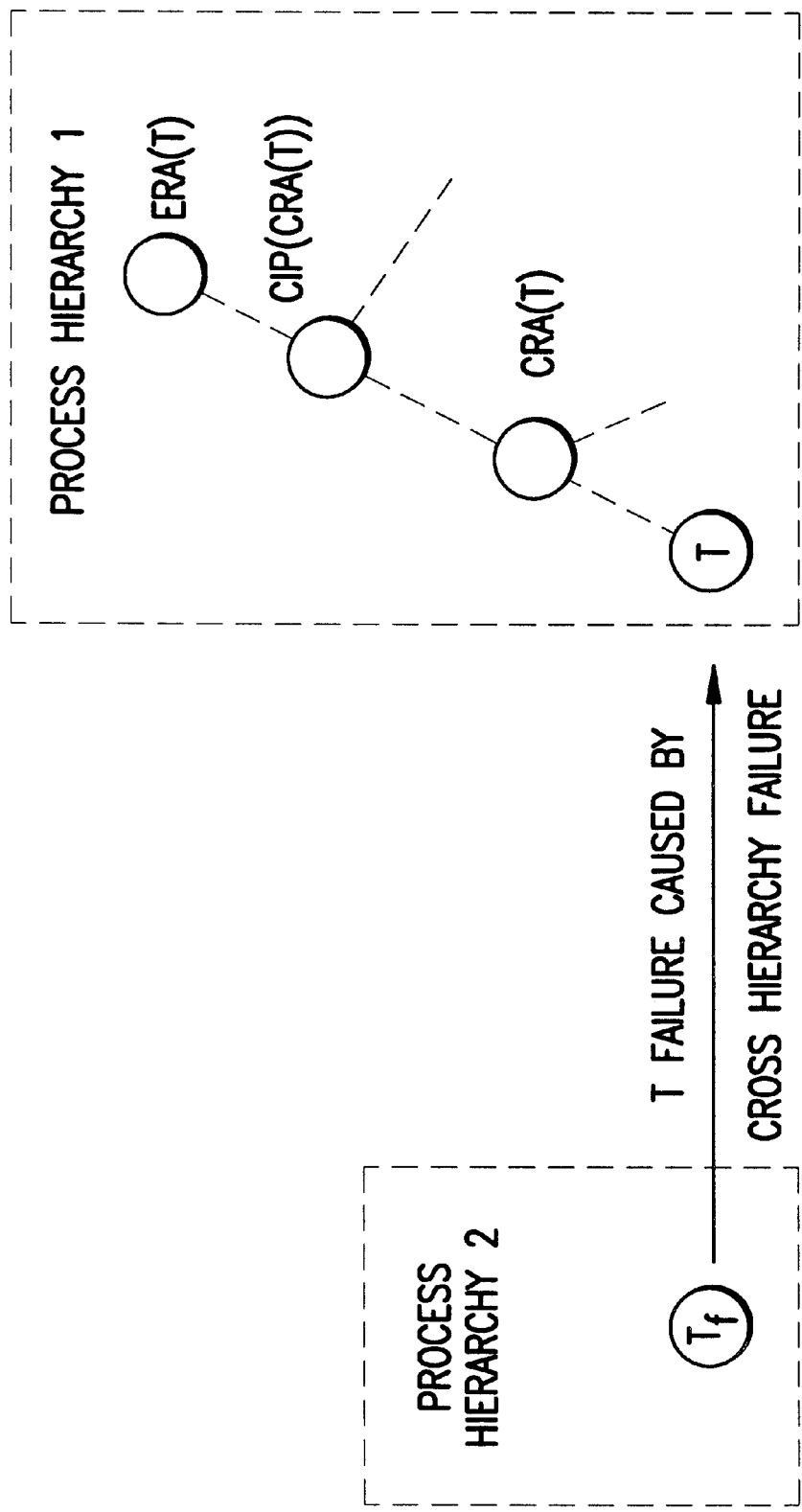
FIG. 9 shows an embodiment of recovery from transaction failure according to the present invention wherein the in-block recoverable transaction closest to the failed transaction is not in progress.

If $T_{dc}$, the closest descent transaction of the CRA($T_y$) transaction is in-progress, by undoing CRA($T_y$), the failure originally transferred to $T_y$ is recoverable in the block that $T_d$ and CRA($T_y$) reside. FIG. 8 shows such an embodiment of recovery from transaction failure wherein the CRA is in progress. However, the CRA ($T_y$) itself may not always be functionable as the root for undoing. This is because if the failed transaction $T_y$ has been committed, then the effects of $T_y$ may have been visible beyond its block and thus the transactions committed after $T_y$ may not be in-block recoverable. To determine the failure scope, it is necessary to find the closest in-progress ancestor of $T_y$ that is recoverable in its own block. The tracing upward to determine the abort or compensate chain terminates in that block. First, the closest in-progress ancestor transaction (CIP) of the CRA($T_y$) transaction up the ancestor tree of CRA($T_y$) is found by a step expressed by the function CIP(CRA($T_y$)). Then the closest recoverable ancestor of the CIP on the ancestor tree of the CIP is found. Such a transaction is called the extended recoverable ancestor (ERA) herein and is expressed by the function CRA(CIP(CRA($T_y$))). If the closest descendant transaction of the CRA(TY) is in progress, then the ERA is the CRA($T_y$). This is shown by FIG. 9. If the CIP is self-recoverable, then it is the ERA and is the root of undoing. Otherwise, the ERA, i.e., the root of undoing, is a dummy note that is the closest recoverable parent of the CIP, i.e., having the CIP as its closest descendant transaction. The failure originally transferred to $T_y$ across hierarchy is recoverable by undoing the subtree beneath the ERA($T_y$) transaction. If the top-level transaction has committed then the whole transaction hierarchy should be undone. The algorithm for determining ERA(T) is as the follows:

```
if state(closest-descendant-transaction (CRA(T)))==in-progress
then ERA(T)=CRA(T)(regardless of whether T is in-progress or not);
else if state (closest-descendant-transaction(CRA(T)))==committed then
    if is-top(CIP(T)) then ERA(T)=CIP(T);
    else ERA(T)=CRA(CIP(CRA(T)))
else ERA(T) is undefined.
```

In the above example, if $T_x$ and $T_y$ reside in different branches of the same transaction hierarchy, the above ERA may be located beyond their closest common ancestor, then both branches should be logically undone.

Although the preferred embodiment of the present invention has been described and illustrated in detail, it is to be understood that a person skilled in the art can make modifications within the scope of the invention.

What is claimed is:

1. A method for managing a plurality of transactions of a set of processes including one or more processes in a computer database system, each process including a nested plurality of transactions having more than two levels of hierarchies, comprising:

(a) upon the failure of a transaction (FFT) in one of the processes, identifying an ancestor tree including nested blocks of transactions in the process and on the ancestor tree an in-progress closest recoverable ancestor (ICRA) without regard to the level of hierarchies of the ICRA in the process in which the failed transaction occurs, the ICRA being the in-block recoverable transaction nearest to the FFT and in progress in a ICRA-containing block; and (b) undoing all transactions from the ICRA downward, including at least one of the group of aborting and compensating from the ICRA to the FFT.

2. The method according to claim 1 further comprising noticing the success or failure in a failure-causing transaction not in the process, wherein the noticed success or failure of the failure-causing transaction will cause a failure of the transaction (FFT) in the process.

3. The method according to claim 1 further comprising identifying the ICRA in the ancestor tree of the FFT wherein the ICRA is one of the group of retriable, non-critical to the block, and having in the block an alternative transaction path not including the FFT.

4. The method according to claim 1 wherein the ICRA is either non-critical to the block or has in the block an alternative transaction path not including the FFT.

5. The method according to claim 1 further comprising processing the process through an alternative transaction path proceeding from the ICRA, the alternative transaction path including transactions that are different from ancestors of the FFT below the ICRA.

6. The method according to claim 1 further comprising: eliminating the effect of the FFT and of any transactions that are ancestors of the FFT below the ICRA in the ancestor tree and further processing the ICRA-containing block through an alternative path of transactions proceeding downward from the ICRA, the alternative path including transactions that are different from ancestors of the FFT below the ICRA.

7. The method according to claim 1 further comprising: adding a dummy transaction note to the ancestor tree as a parent to a transaction in a nonhierarchical transaction structure to render the transaction structure hierarchical.

8. The method according to claim 7 further comprising arranging concurrent transactions into blocks of transactions, some of the blocks being subblocks of others, by adding a dummy transaction note as a parent to concurrent transactions to render the transaction structure hierarchical.

9. The method according to claim 7 further comprising arranging sequential transactions into blocks of transactions, some of the blocks being subblocks of others, by adding a dummy transaction note as a parent to each of the sequential transactions that are not terminal to link all sequential transactions to other transactions hierarchically.

10. The method according to claim 2 further comprising identifying on the ancestor tree of FFT a closest recoverable ancestor (CRA) which is the in-block recoverable transaction nearest to the FFT in a CRA-containing block, and identifying a closest in-progress ancestor (CIP) of the CRA, the CIP being the nearest transaction to the CRA on the ancestor tree of FFT wherein said nearest transaction is neither committed nor aborted.

11. The method according to claim 10 further comprising: identifying a closest recoverable ancestor (ERA) of the CIP as the ICRA, the ERA being the nearest transaction to the CIP, on the ancestor tree of the FFT, that is non-critical to an in-progress block including the CIP or has in said in-progress block an alternative transaction path that does not include the CIP.

12. The method according to claim 10 further comprising identifying the CRA wherein the CRA is not in-progress.

13. The method according to claim 10 further comprising identifying the CRA wherein the CRA is in-progress.

14. The method according to claim 1 further comprising arranging the transactions in a block into a hierarchy of transactions.

15. The method according to claim 14 further comprising arranging sequential transactions into blocks of transactions, some of the blocks being subblocks of others, by adding a different dummy transaction note to as a parent to each of the sequential transactions that are nonterminal to link the sequential transaction to another transaction hierarchically, and further comprising adding a dummy transaction note as a parent to all of the concurrent transactions to link the concurrent transactions hierarchically to the dummy transaction.

16. A method for managing a first process including transactions wherein one or more of the transactions may be subtransaction of others, comprising:
(a) providing a hierarchy of blocks of transactions of the first process in which all nonterminal transactions are linked hierarchically, some of the blocks being subblocks of others;
(b) noticing failure in a transaction in a second process whose transactions are not transactions of the first process, wherein a failure of the second-process transaction will cause a failure of a transaction (FFT) in the first process;
(c) identifying an ancestor tree of the FFT and on the ancestor tree a closest recoverable ancestor (CRA) in a block containing the CRA, the CRA being the nearest in-block recoverable transaction to the FFT;
(d) identifying a closest in-progress ancestor (CIP) of the CRA, the CIP being the nearest transaction to the CRA, on the ancestor tree of the FFT, that is neither committed nor aborted.
(e) identifying a closest recoverable in-progress ancestor (ERA) of the CIP, the ERA being the nearest transaction to the CIP, on the ancestor tree of the FFT, that is in-block recoverable in a block containing the CIP; and
(f) undoing all transactions from the ERA downward by at least one of the group of aborting and compensating from the ICRA to the FFT.

17. A transaction management system for managing a process having a plurality of transactions in nested form with multiple levels of hierarchies, comprising:
(a) computer means for identifying an ancestor tree in the process with multiple levels of hierarchies of a failed transaction (FFT) in the process and determining an in-progress closest recoverable ancestor (ICRA) in a nested block of transactions including the ICRA in the ancestor tree without regard to the level of hierarchies of the ICRA in the process in which the failed transaction occours, the ICRA being the nearest transaction to the FFT, on the ancestor tree of the FFT, that is in-block recoverable and in-progress; and
(b) computer means for undoing from the ICRA downward, including one of the group of aborting and compensating one or more transactions.

18. The system according to claim 17 further comprising means for allowing a transaction in the process to notice success or failure in a failure-causing transaction not in said process, wherein the success or failure of the failure-causing transaction will cause a failure of the transaction FFT.

19. The system according to claim 18 further comprising computer means for identifying a closest recoverable ancestor (CRA) of FFT which is the in-block recoverable transaction nearest to the FFT in a CRA-containing block, and identifying a closest in-progress ancestor (CIP) of the CRA, the CIP being the nearest transaction to the CRA, on the ancestor tree of the FFT, that is neither committed nor aborted as viewed from outside the first process.

20. The system according to claim 19 further comprising computer means for identifying a closest recoverable in-progress ancestor (ERA) of the CIP, the ERA being the nearest in-block recoverable transaction to the CIP on the ancestor tree of the FFT in a block containing the CIP.

21. The system according to claim 18 wherein the system further comprises computer means for arranging the transactions in a block in the process into a hierarchy of transactions.

22. A program storage medium readably by a computer, tangibly embodying a program of instruction including code means executable by the computer to manage transactions in a process in a database system wherein the process has a plurality of transactions in nested form having more than two levels of hierarchies, the program storage medium comprising:
a memory device having code means, said code means including,
(a) code means for noticing the success or failure in a failure-causing transaction not in the process, wherein the noticed success or failure of the failure-causing transaction will cause a failure of a transaction (FFT) in the process;
(b) code means for identifying an ancestor tree of the failed transaction FFT in the process, the ancestor tree including nested blocks of transaction in the process, the code means further for identifying on the ancestor tree an in-progress recoverable ancestor (ICRA) closest to the failed transaction FFT without regard to the level of hierarchy of the ICRA in the process the failed transaction occurs, the ICRA being the nearest in-block recoverable transaction to the FFT and in progress in a ICRA-containing block; and
(c) code means for undoing all transactions from the ICRA downward, including at least one of the group of aborting and compensating from the ICRA to the FFT.

23. A method for managing a plurality of transactions of a process in a computer database system, the process including a nested set of transactions, comprising:
(a) upon the failure of a transaction (FFT) in the process, identifying an ancestor tree including nested blocks of transactions in the process and on the ancestor tree an in-progress closest recoverable ancestor (ICRA), the ICRA being the in-block recoverable transaction nearest to the FFT and in progress in a ICRA-containing block, wherein the ICRA is one of the group of retriable, non-critical to the block, and having in the block an alternative transaction path not including the FFT; and
(b) undoing all transactions from the ICRA downward, including at least one of the group of aborting and compensating from the ICRA to the FFT.

24. The method according to claim 1 wherein the step of identifying the ICRA comprises bypassing any FFT's closest recoverable ancestor that is no longer in progress.

25. The method according to claim 1 wherein the undoing will undo all the transaction from the ICRA downward in the ancestor tree of the FFT regardless of whether the FFT fails due to a failed transaction in the ancestor tree of the FFT or a failed transaction in an ancestor tree of another process in the set of processes.

26. The system according to claim 17 wherein the ancestor tree of the process includes more than two levels of hierarchies.

* * * * *